May 17, 1932.        J. C. MOTTASHED ET AL        1,858,457
TIME STUDY RECORDER
Filed Feb. 25, 1930        2 Sheets-Sheet 1

Inventors:
John C. Mottashed
Arthur W. Payne
by Macleod, Calver, Copeland & Dike
Attorneys.

May 17, 1932.  J. C. MOTTASHED ET AL  1,858,457
TIME STUDY RECORDER
Filed Feb. 25, 1930    2 Sheets-Sheet 2
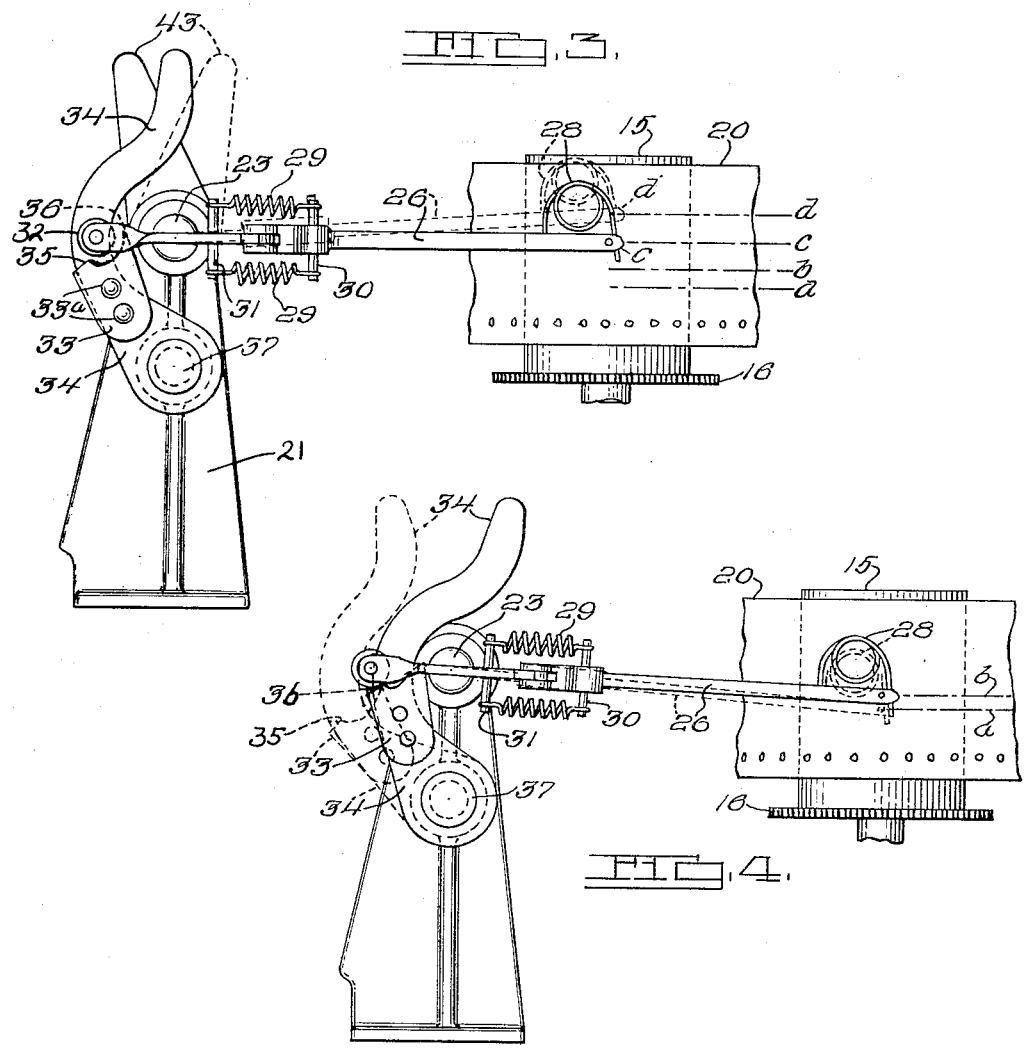
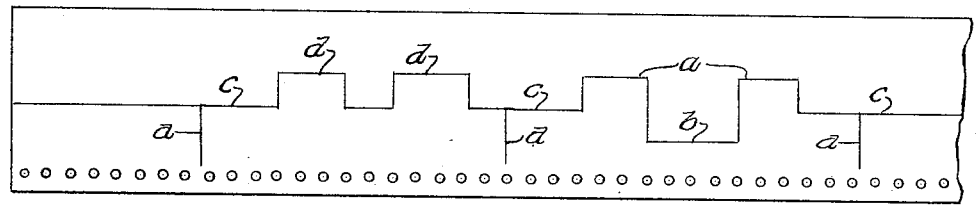
Inventors:
John C. Mottashed
Arthur W. Payne
by Macleod, Calver, Copeland & Dike
Attorneys.

Patented May 17, 1932

1,858,457

UNITED STATES PATENT OFFICE

JOHN C. MOTTASHED AND ARTHUR W. PAYNE, OF DETROIT, MICHIGAN, ASSIGNORS TO HUDSON MOTOR CAR COMPANY, OF DETROIT, MICHIGAN, A CORPORATION OF MICHIGAN

TIME STUDY RECORDER

Application filed February 25, 1930. Serial No. 431,149.

This invention relates to recording machines, and more particularly to a machine for recording graphically the exact time consumed in performing a sequence of operations or a series of elements of any given operation.

An object of the invention is to provide a machine especially adapted for use in time study work in factories and plants where it is desired to ascertain with exactness the length of time taken by workmen to accomplish a given manual job or operation, the invention enabling independent observers to obtain accurate and reliable time study records not only of the over-all time of an operation or job, but also each element or step thereof. Consequently, in using such records it is possible to determine costs more accurately and also a proper rate or scale of wages, such, for instance, as the proper base rate for a given piece work job in cases where a large number of workmen may each be engaged in performing a similar job.

The present machine embodying the invention is therefore especially adapted to make time study records of manual operations as distinguished from purely machine operations.

Another object of the invention is to provide a machine, which may be used by an observer in time study work, capable of being manually controlled in such manner as to permit accurate graphical recording, on a tape or strip moving at a timed rate of speed, of (1) each element or operation of a sequence, (2) the start and stop of each element or operation, (3) the start and stop of any deductible elements, such as delays or interruptions during an operation, and (4) the time of each operation of the sequence and of each deductible delay or interruption during the sequence.

Other objects of this invention will appear in the following description and appended claims, reference being had to the accompanying drawings wherein like reference characters designate corresponding parts in the several views.

Fig. 3 is a fragmentary side elevation taken at one side of the machine illustrating certain of the operating mechanism for the stylus.

Fig. 4 is a similar view illustrating the operating parts in different positions.

Fig. 5 illustrates diagrammatically a record formed on the record tape during operation of the machine.

Figure 1:
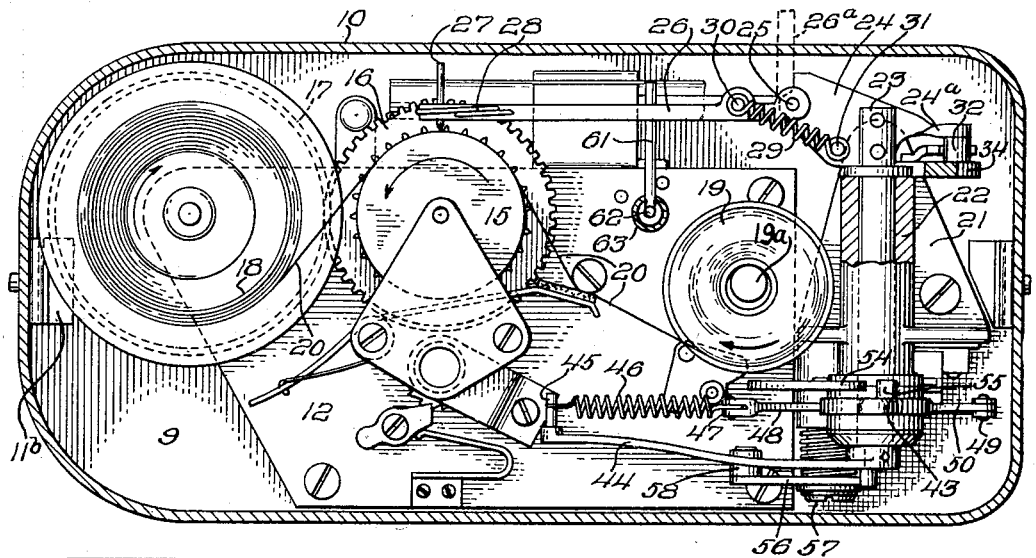
Fig. 1 is a sectional plan view illustrating a machine embodying the invention.

Before explaining in detail the present invention it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

In the drawings we have illustrated one embodiment of the invention, although of course it is understood that changes may be made within the spirit of the invention. The operating mechanism is housed within a suitable casing comprising a base plate 9 and an enclosing cover 10. The latter is releasably connected to the base plate by means of spring pawls 11 adapted to cooperate with latch members 11b, the pawls being releasable from outside the casing by pressing inwardly the plungers 11a.

Mounted on the base plate 9 is a casing 12 containing a spring motor driven by clock mechanism. Through the medium of suitable mechanism, including reduction gearing 13 and 14, the motor drives at a predetermined rate of speed a platen or feed roll 15 which in turn drives, through the medium of gears 16 and 17, a winding reel 18. The roll of tape or paper 19, on which the graphical record is made, may be rotatably supported on a vertical spindle 19a, and the strip or tape 20 is fed over the face of the platen 15 and wound on the reel 18.

Secured to the base 9 is an upstanding bracket 21, which carries at the upper end a transverse sleeve bearing 22 through which extends a rock shaft 23, the shaft being journaled in the bearing for rocking movement. One end of the shaft 23 is slotted to receive a plate 24 which is secured thereto, this plate being pivoted at 25 to a stylus arm 26. The stylus arm carries at its outer end a suitable stylus 27, which may be in the form of a lead, the stylus being held in position by means of a spring 28 carried by the stylus arm. It will be seen that the stylus arm 26 is carried by the rock shaft 23 through the medium of the supporting plate 24, and that the arm is pivoted to the plate at 25 so that it may be swung outwardly to the dotted line position 26a in Fig. 1. The stylus is yieldingly pressed against the recording sheet or tape 20 on the platen 15 by means of a pair of springs 29 (see Figs. 1, 3 and 4), these springs embracing opposite sides of the arm 26 and plate 24 and being connected thereto by means of pins 30 and 31 respectively.

The end of the supporting plate 24 at the opposite side of the rock shaft 23 from the stylus arm is bent or twisted at 24a into a vertical plane and carries at its inner side a cam roller 32. A cam member 33 is secured at 33a beneath the roller 32 to an oscillating lever 34, this member having cam faces 35 and 36 adapted to engage at different times the roll 32 when the lever 34 is oscillated forwardly or rearwardly. The lever 34 is secured at its lower end to a transverse rock shaft or spindle 37 journaled in a bearing in the bracket or standard 21. Secured to the opposite end of the rock shaft or spindle 37 is a cam 38, see Fig. 2, engaging a plate 39 carried by a slide member 40. The slide 40 is shiftable within a slideway formed in a member 41 fixed to the standard 21. When the shaft 37 is oscillated the cam 38 operates to shift the slide 40 downwardly and this movement is counteracted by means of a spring 42 one end of which is secured to the lower end of the slide and the upper end of which is connected to the fixed member 41.

From the foregoing it will be seen that swinging or oscillating movement of the lever 34 is resisted by means of the spring 42. When the lever is swung forwardly into the full line position of Fig. 4 the roll 32 is engaged by the cam 35 swinging the stylus arm 26 to the full line position, and when the lever is swung in the opposite direction as shown in dotted lines in Fig. 4 the cam 36 engages the roll and swings the stylus arm 26 a greater distance transversely of the tape as shown in dotted lines. When the lever 34 is released from either of the positions shown in Fig. 4 the spring 42 functions to rock the shaft 37, returning the lever to its normal position illustrated in full lines in Fig. 3, the roll 32 lodging in a slight notch or depression located between the cams 35 and 36.

At the opposite side of the casing from the lever 34 the sleeve 22 is turned down to provide a bearing for an oscillating bell crank lever 43, the hub of this lever surrounding the rock shaft 23 but adapted to be oscillated independently thereof. At the outer side of the lever 43 a radius arm 44 is secured at its inner end to the rock shaft 23. This arm carries at its outer end a projecting pin 45 to which is secured one end of a tension spring 46, the opposite end of the spring being connected at 47 to the forward end of a curved or arcuate link 48. The rear end of this link is pivoted at 49 to the crank arm 50 extending from the hub of the oscillating lever 43. The hub of the lever 43 is slotted at its under side to form stops or abutments 51 and 52 adapted to engage a stop pin 53 secured to the bracket 21, thereby limiting the forward and rearward swinging movement of the lever. The lever is also provided on its inner face with a lug or abutment 55 which, when the lever is swung forwardly into the dotted line position of Fig. 2, contacts with the free end of an arm 54, the lower end of which is secured to the rock shaft 37.

Figure 2:
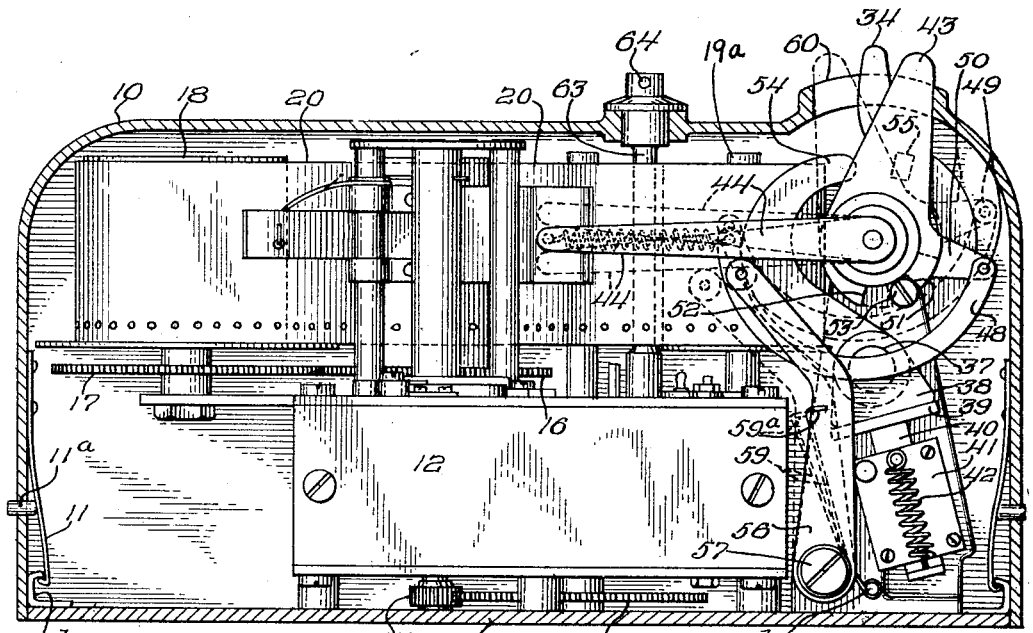
Fig. 2 is a longitudinal sectional elevation.

The arm 44 is supported and normally maintained in its horizontal position, shown in full lines in Fig. 2, by means of a yielding lever 56 pivoted at its lower end to a pivot screw 57 and carrying at its upper end a roll 58 engaging the under side of the arm 44. A coil spring 59, one end of which engages the lever at 59a and the other end of which is secured to a pin 59b, maintains the lever 56 normally in the full line position of Fig. 2. Since the radius arm 44 and the stylus arm 26 extend forwardly from opposite ends of the rock shaft 23 it will be seen that the spring controlled lever 56 functions to support these arms normally in horizontal position. Therefore, when the levers 34 and 43 are in their normal position as shown in full lines in Fig. 2, the stylus arm is set in its horizontal position which is indicated in full lines in Fig. 3. When the shaft 23 is turned or rocked by operation of lever 34 the arm 44 will swing downwardly into either of two positions, depressing the member 56 against the action of its spring, as shown in dotted lines in Fig. 2. Upon release of lever 34 the spring actuated member 56 will return the arm 44 and stylus arm to horizontal position, so that the stylus arm is thus normally set in the full line position indicated in Fig. 3.

When the lever 43 is in its normal position as illustrated in full lines in Fig. 2, it will be seen that the spring 46 extends substantially parallel to the arm 44. At this time the point of connection 47 of the spring and link 48 lies on a dead center between the pivot of the arm 44 and the point of connection 45 of the spring and arm. Upon swinging the lever 43 forwardly to the dotted line position of Fig. 2 the link 48 is shifted upwardly by means of the crank arm 50, thus shifting the point of connection 47 above the imaginary center line extending from the pivot of arm 44 to the point 45. When this occurs the spring 46, which is always under tension, automatically swings the arm 44 upwardly to the upper dotted line position of Fig. 2 until the point 47 is again in the dead center position. Consequently, this action results in rocking the shaft 23 and shifting the stylus arm 26 to its dotted line position illustrated in Fig. 3. The lever 43 remains in this position until it is manually shifted rearwardly, and the reverse action of the spring 46 automatically returns the stylus arm to its normal position illustrated in full lines in Fig. 3.

From the foregoing it will be seen that the movement of the lever 43 forwardly or rearwardly merely shifts the point of connection 47 of the spring 46 with the link 48, the spring automatically shifting the stylus 27 transversely of the tape 20. On the other hand, movement of the lever 34 forwardly or rearwardly from its central position illustrated in full lines in Fig. 2 results in a positive shifting of the stylus 27 transversely of the tape into either one of two positions, the spring 42 returning the lever to its normal position and the spring actuated member 56 returning the stylus to its normal position.

Furthermore, assuming that the lever 43 is in its forward dotted line position with the abutment 55 impinging against the end of arm 54, if the lever 34 is then shifted rearwardly, as indicated in dotted lines in Fig. 4, the arm 54, which is attached to the rock shaft 37, will be swung rearwardly and will coact with the abutment 55 so as to return the lever 43 to its normal position. Hence, if the stylus is at position $d$ in Fig. 3, and the lever 34 is swung rearwardly so as to shift the stylus to line $a$, when the lever is released, the stylus will return to position $c$ and not to position $d$.

It will be noted that the cams 35 and 36 and also the notch or depression lying between these cams are all at different radial distances from the center of shaft 37. Hence, the cam 36 will swing about the center of this shaft on an arc having the greatest radius and the base of the notch will swing on an arc having the least radius. Moreover, when lever 34 is in its normal central position the roller 32 does not rest in the notch or depression (see Fig. 3), but a sufficient clearance is provided so as to allow radius arm 44 to rise and roller 32 to be depressed when lever 43 is thrown forwardly in order to shift the stylus into position $d$.

The levers 34 and 43 project upwardly through slots 60 in the casing into position to be readily accessible for control by the operator. The clock motor may be started or stopped by means of a horizontally swinging arm 61 which is attached to a rotatable spindle 62, the arm being operated from the top of the casing by means of a rotatable sleeve 63 slotted at its lower end to fit over the arm 61 and carrying a knurled head 64 at the top of the casing which may be turned by the operator to swing the arm 61 and thereby start or stop the motor.

Referring now to Figs. 3, 4 and 5, as the tape travels longitudinally over the platen 15 at a timed rate of speed, such as 25 mm. per minute, and assuming that the levers 34 and 43 are in their normal full line positions shown in Fig. 3, the stylus will at this time be set at position $c$ and will trace a longitudinal line indicated at $c$ in Fig. 5. Assuming also that it is desired to make a time study record of a sequence of elements or steps of an operation manually performed by a workman, at the start of the first element the observer presses the lever 34 rearwardly to the dotted line position of Fig. 4 and releases it. This action shifts the stylus transversely of the tape to position $a$ and then back to position $c$. This starting point of the first element is indicated by the transverse vertical line $a$ at the left in Fig. 5. The stylus being at position $c$, the line $c$ at the left in Fig. 5 is then formed on the tape indicating the first element. At the end of the first element of the operation the observer shifts the lever 43 forwardly to the dotted line position of Fig. 3, moving the stylus upwardly to position $d$ and forming a transverse line of given length indicating the end of element one and the beginning of element two. The length of line $d$ in Fig. 5 indicates the length of the second element of the job, and at the end of this the lever 43 is shifted rearwardly to its full line position of Fig. 3, returning the stylus to position $c$. This is continued for each successive element or operation, the line $c$ and $d$ of the graph, separated by the transverse lines, indicating the length of each successive element or operation. If no interruption occurs, the observer indicates the termination of a given series of operations or sequence of steps or elements in a given job or operation by shifting the lever 34 rearwardly and forming the transverse line $d$. Hence, the lines $d$ upon the graph indicate the start and stop of any given sequence of steps, elements, or operations being recorded.

Referring now to the portion of the diagram at the right hand side of Fig. 5, assuming that the workman is carrying on an operation indicated by the line $d$, but is interrupted, the observer at the commencement of the interruption shifts the lever 34 forwardly to the full line position of Fig. 4, moving the stylus transversely to position $b$. This forms a transverse line indicating the start of the interruption and the length of line $b$ in Fig. 5 indicates the duration of the interruption. When the workman returns for the completion of operation *d* the observer releases lever 34 and the stylus is immediately returned to position *d* again and the completion of the operation is recorded. Line *b* therefore indicates the deductible delay in the operation, the exact duration of which is measured by the record.

From the foregoing it will be seen that the operating mechanism is such as to enable the observer to make an accurate and reliable time study record of successive operations or elements of an operation performed by a workman, the start and stop of each operation, the duration thereof, and the start and stop of each deductible delay or interruption. The mechanism may be selectively controlled to shift the stylus in parallel paths transversely of the tape into a number of set or predetermined positions, such as four, so as to produce a number of parallel longitudinal lines on the tape, lying in different planes, indicating the length and duration of successive elements or operations, any deductible delays or interruptions, the starting and stopping points of the series of operations or elements, and the over-all time consumed.

We claim:

1. In a machine for recording elements of an operation or a succession of operations, the combination of a tape movable longitudinally at a timed rate of speed, a stylus engaging the tape, devices for separately shifting the stylus in parallel paths transversely of the tape and for setting the stylus in predetermined transversely spaced positions to form parallel longitudinal lines during travel of the tape representing successive elements of an operation, and manually operated means for selectively controlling said devices.

2. A machine for recording elements of an operation or a series of operations, comprising a tape movable at a timed rate of speed in a predetermined path, a stylus engaging said tape, means for releasably maintaining the stylus in one position to normally form a single line in the direction of travel of the tape, means for shifting the stylus transversely of said line into a predetermined position to form a parallel line, means for limiting the transverse movement of the stylus into said position, and means coacting with said second means for returning the stylus to said first position.

3. A machine for recording elements of an operation or a series of operations, comprising a tape movable at a timed rate of speed in a predetermined path, a stylus engaging said tape, means for releasably maintaining the stylus in one position to normally form a single line in the direction of travel of the tape, devices for separately shifting the stylus transversely of said line into different positions, means for limiting said movements, and means for actuating one device from another to return the stylus to said first position.

4. A machine for recording elements of an operation or a series of operations, comprising a tape movable longitudinally at a timed rate of speed, a stylus normally engaging said tape at a predetermined position normally to form a longitudinal line, a device movable for shifting the stylus to a second predetermined position spaced transversely of said line and also movable to return the stylus to said first position, and manually operated means for controlling said device.

5. A machine for recording elements of an operation or a series of operations, comprising a tape movable longitudinally at a timed rate of speed, a stylus normally engaging said tape in a predetermined position to form a single longitudinal line, a device for shifting the stylus to a second predetermined position spaced transversely of said line, a second device for shifting the stylus to a third predetermined position spaced transversely of said line, and means for returning the stylus to said first position upon releasing said last device.

6. A machine for recording elements of an operation or a series of operations, comprising a tape movable longitudinally at a timed rate or speed, a stylus normally engaging said tape in a set position to form a longitudinal line, a device for shifting the stylus to a second set position spaced transversely of said line, a second device for shifting the stylus to a third position spaced transversely of said line, and means for returning the stylus to said second named position upon release of said second device.

7. A machine for recording elements of an operation or a series of operations, comprising a tape movable longitudinally at a timed rate of speed, a stylus normally engaging said tape in a set position against transverse movement, a device adapted to be manually operated for shifting the stylus transversely into two different positions spaced transversely from said line, and means for returning the stylus to said first position upon releasing said device.

8. A machine for recording elements of an operation or a series of operations, comprising a tape movable longitudinally at a timed rate of speed, a stylus normally engaging said tape in a set position against transverse movement, a device adapted to be manually operated in opposite directions for shifting the stylus transversely into two different positions spaced transversely from said line, and means for returning the stylus to said first position upon releasing said device.

9. A machine for recording elements of an operation or a series of operations, comprising a tape movable longitudinally at a timed rate or speed, a stylus normally engaging said tape in a set position against transverse movement, a means for shifting the stylus to a second set position spaced transversely of said line, means for shifting the stylus into third and fourth positions spaced transversely of said line, and a device for actuating one of said means from the other.

10. A machine for recording elements of an operation or a series of operations, comprising a tape movable longitudinally at a timed rate of speed, a stylus normally engaging said tape in a set position against transverse movement, a device for shifting the stylus to a second set position spaced transversely of said line, a device for shifting the stylus into third and fourth positions spaced transversely of said line, and means for actuating said first device through the second device whereby the stylus will return to said first position.

11. In a recording machine, the combination of a clock driven tape movable in a predetermined path, a stylus engaging said tape, mechanism for shifting said stylus in opposite directions into a plurality of predetermined spaced positions transversely of the tape, and manually operated means for selectively controlling said mechanism.

12. In a recording machine, the combination of a clock driven tape movable in a predetermined path, a stylus engaging said tape, mechanism for shifting said stylus into a plurality of predetermined spaced positions transversely of the tape, said mechanism including cam means for shifting the stylus into one of said positions and spring means for shifting the stylus into another position, and manually operated means for selectively controlling said mechanism.

13. In a recording machine, the combination of a clock driven tape movable in a predetermined path, a stylus engaging said tape, cam means and spring means each adapted to move the stylus into a predetermined position spaced transversely of the tape, and manually operated means for controlling said cam means and spring means.

14. In a recording machine, the combination of a clock driven tape movable in a predetermined path, a stylus engaging said tape, a mechanism for setting said stylus at any one of a series of predetermined transversely spaced positions on the tape to form a series of correspondingly spaced parallel lines during the travel of the tape, and manually operated means for selectively controlling said mechanism, said mechanism having means for returning the stylus to a predetermined normal position.

15. In a recording machine, a tape movable longitudinally at a timed rate of speed, a stylus arm carrying a stylus engaging said tape, a rock shaft connected to said arm, spring means movable into position to rock said shaft in opposite directions thereby shifting the stylus transversely of the tape into two positions, and means for rocking said shaft to shift the stylus transversely of the tape into a third position on the tape.

16. In a recording machine, a tape movable longitudinally at a timed rate of speed, a stylus arm carrying a stylus engaging said tape, a rock shaft connected to said arm, spring means movable into position to rock said shaft in opposite directions thereby shifting the stylus transversely of the tape into two positions, and a lever adapted to actuate said arm to shift the stylus transversely of the tape into a third position.

17. In a recording machine, a tape movable longitudinally at a timed rate of speed, a stylus arm carrying a stylus engaging said tape, a rock shaft connected to said arm, spring means movable into position to rock said shaft in opposite directions thereby shifting the stylus transversely of the tape into two positions, a lever adapted to actuate said arm to shift the stylus transversely of the tape into a third position, and means operated by said lever for actuating said spring means.

18. In a recording machine, a tape movable longitudinally at a timed rate of speed, a stylus arm carrying a stylus engaging said tape, a rock shaft connected to said arm, spring means movable into position to rock said shaft in opposite directions thereby shifting the stylus transversely of the tape into two positions, an operating member having cam means adapted to actuate said stylus arm to shift the stylus transversely of the tape into third and fourth positions, yielding means for counteracting movement of said member, means for actuating said spring means from said member, and means for actuating the spring means independently of the member.

In testimony whereof we affix our signatures.

JOHN C. MOTTASHED.
ARTHUR W. PAYNE.